Jan. 24, 1956  W. E. DIEFENDERFER  2,731,980
PRESSURE REGULATING AND SHUT-OFF VALVE
Filed Oct. 3, 1952  3 Sheets-Sheet 1

INVENTOR
WILLIAM E. DIEFENDERFER
BY Roger B. McCormick
ATT'Y.

Jan. 24, 1956  W. E. DIEFENDERFER  2,731,980
PRESSURE REGULATING AND SHUT-OFF VALVE
Filed Oct. 3, 1952  3 Sheets-Sheet 2
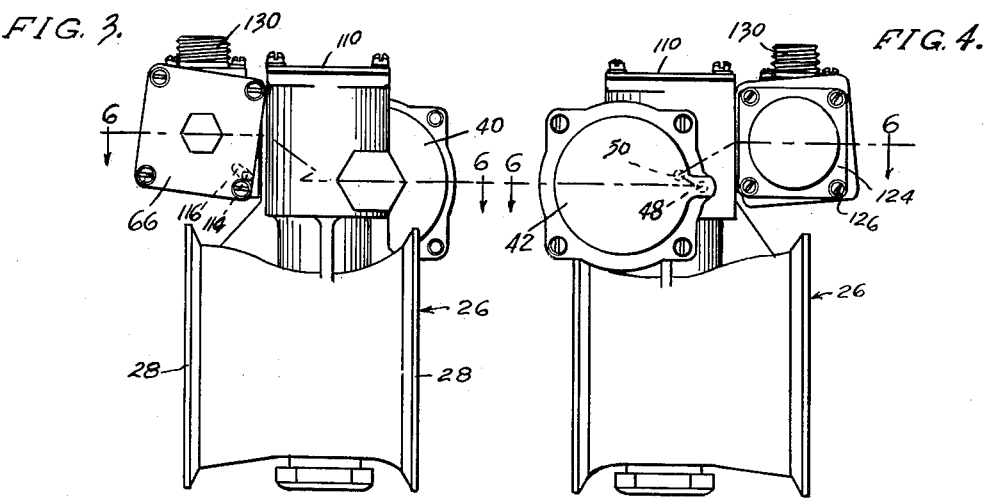
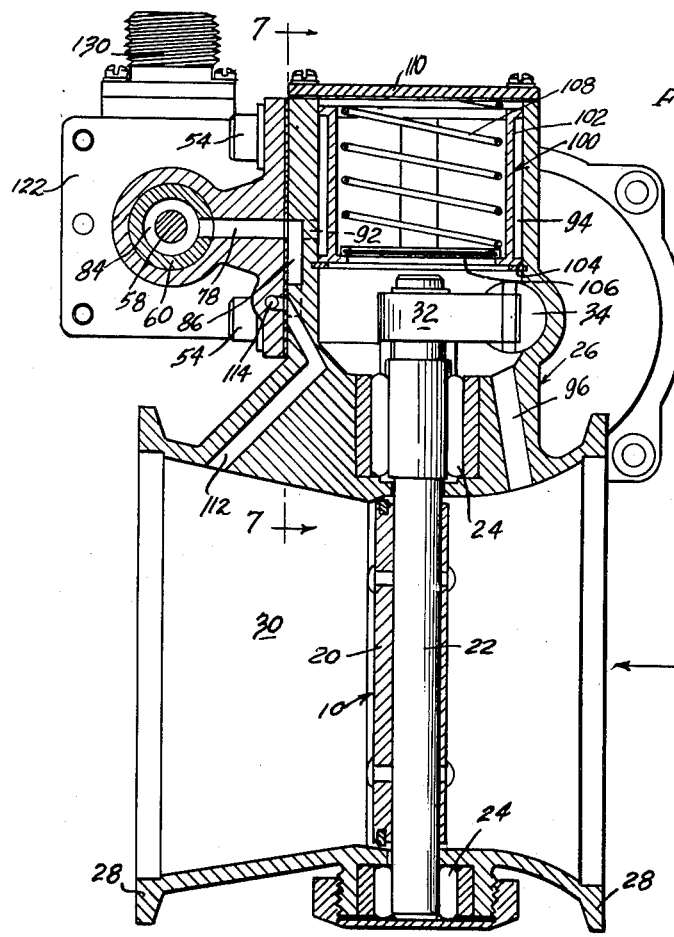
INVENTOR
WILLIAM E. DIEFENDERFER
BY Roger B. McCormick
ATT'Y.

Jan. 24, 1956  W. E. DIEFENDERFER  2,731,980
PRESSURE REGULATING AND SHUT-OFF VALVE
Filed Oct. 3, 1952  3 Sheets-Sheet 3

INVENTOR
WILLIAM E. DIEFENDERFER

BY Roger B. McCormick
ATT'Y.

United States Patent Office 2,731,980
Patented Jan. 24, 1956

2,731,980

PRESSURE REGULATING AND SHUT-OFF VALVE

William E. Diefenderfer, Wethersfield, Conn., assignor to United Aircraft Corporation, East Hartford, Conn., a corporation of Delaware Application October 3, 1952, Serial No. 312,979

5 Claims. (Cl. 137—488)

This invention relates to improvements in valves and, more specifically, to a valve assembly adapted to be coupled in a line leading from a source of pressured gaseous fluid to regulate the pressure within the line and which is also adapted for selective operation to shut off the said line.

It is the general object of the invention to provide a dependable, simple and sturdy, automatic pressure regulating valve assembly for gaseous fluid systems, which assembly can be selectively operated to effect pressure regulation or to shut off the system.

More specific objects and features of the invention will become apparent to those skilled in the art from the following description of the annexed drawings which, by way of preferred example only, illustrate one specific embodiment of the invention.

In the drawings:

Figs. 3 and 4 are views, at reduced scale, of the opposite ends of the assembly;

Fig. 5 is a vertical cross sectional view taken as indicated by line 5—5 in Fig. 2;

Figure 6:
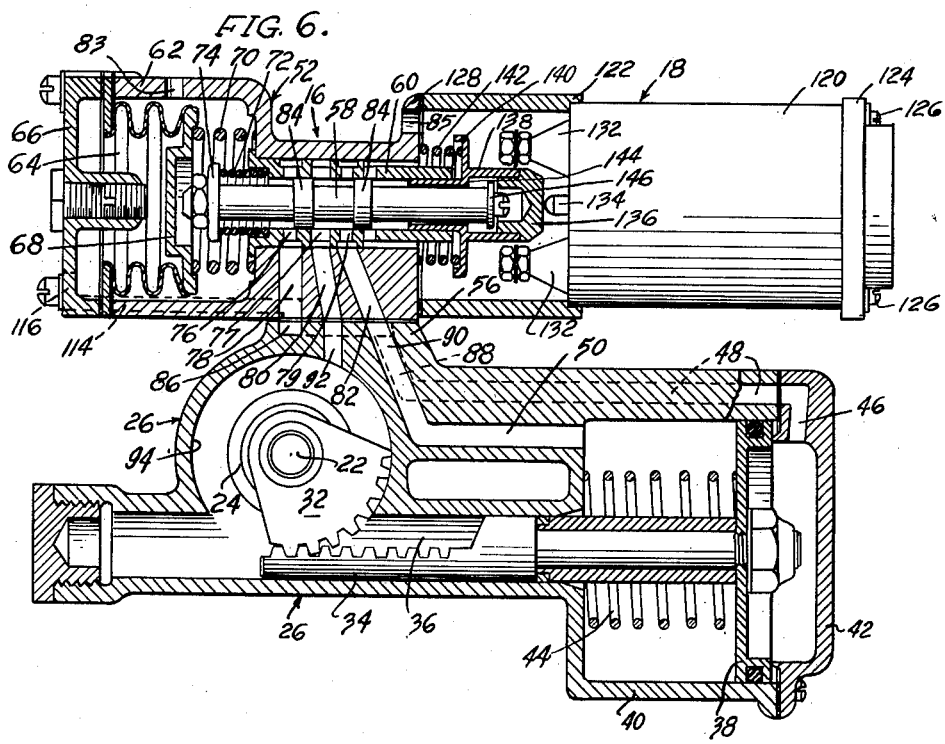
Figure 7:
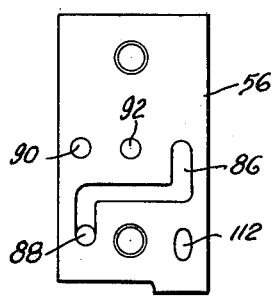

Fig. 6 is a generally horizontal cross sectional view taken as indicated by the lines 6—6 in Figs. 3 and 4; and Fig. 7 is a detail view taken as indicated by line 7—7 in Fig. 5.

While the valve assembly shown in the drawings may be applied to a wide variety of installations, its advantages can be understood by a brief explanation of its use in connection with a pneumatic starter for a turbine engine used on aircraft.

The pneumatic starters recently developed for turbojet engines and the like require, for effective operation, an air supply which falls within a relatively limited pressure range. In multi-engine aircraft, one engine may be started with a pneumatic starter connected to a ground supply of compressed air. The starters on the other engines may then utilize air bled from the compressor of the first engine started. It will be understood that pressure regulating means are particularly necessary to regulate the pressure in the line from the engine compressor. It will also be apparent that the need for pressure regulation exists only during the relatively short time required to start the engines and that shut-off means are then required so that starter operation will cease.

In accordance with the present invention, automatically operable pressure regulating means and shut-off means are incorporated in a unitary valve assembly which is adapted for remote actuation by an operator such as the pilot or flight engineer.

Figure 1:
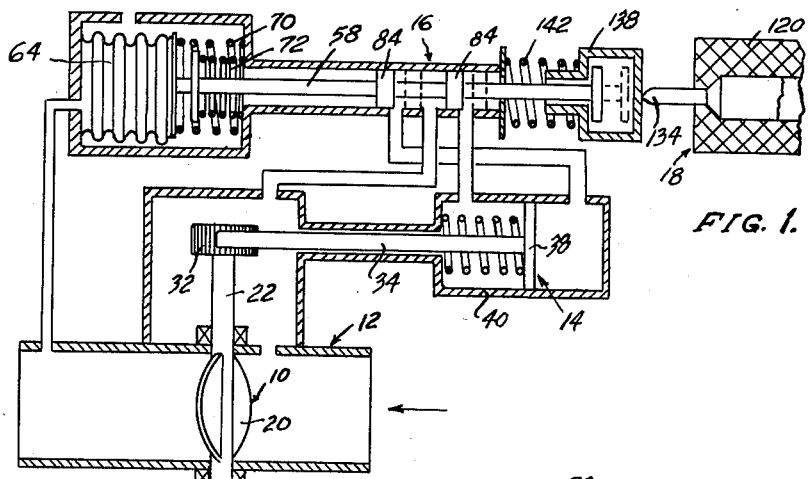
Fig. 1 is a schematic illustration of the valve assembly of the present invention.
Figure 2:
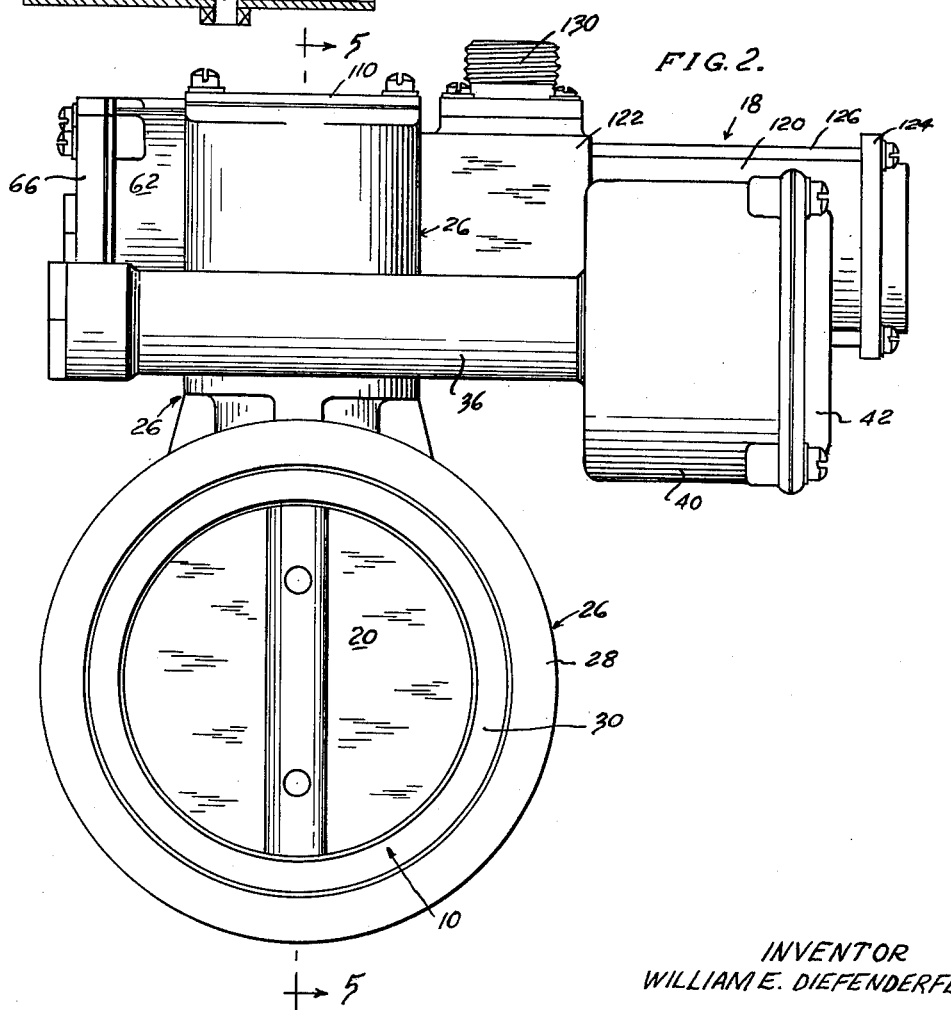
Fig. 2 is a side elevational view of the valve assembly taken transversely of the line in which the assembly is adapted to be coupled.

The major components of the assembly are shown schematically in Fig. 1 and comprise a butterfly type throttle valve 10 pivotally disposed in the pressure line 12 so as to be pivotally adjusted or actuated by means which includes a rack and piston 14 which is shifted by air pressure directed to the opposite faces of the piston by a pilot valve 16. There is also included a solenoid 18 which is cooperatively associated with the pilot valve to render the same pressure responsive when the solenoid is energized and to position the pilot valve to effect closing of the butterfly valve when the solenoid is de-energized.

Referring specifically to the butterfly valve 10, it will be seen in Fig. 5 that the same comprises a disk-like vane 20 secured to a shaft 22 which is rotatably mounted on anti-friction bearing units 24, 24 in a cast housing 26. The said cast housing provides the main support structure for the components of the assembly. In addition, the housing has annular flanges 28, 28 which define a bore 30 and which are adapted to couple the assembly into the line (not shown) from a pressured supply of air. As shown in Fig. 5, the butterfly vane 20 is adapted to close the bore 30 to the passage of air or to be adjustably positioned within the said bore to regulate the pressure on the outlet side of the vane, reference being had to the arrow which indicates the direction of flow.

The means for rotating the shaft 22 and thereby adjusting the position of vane 20 comprise a gear segment 32 fixed to the upper end of the shaft in engagement with a horizontally disposed rack 34. The said rack, which is an element of the previously mentioned piston and rack 14, slides within a cylindrical bore 36 defined in the housing 26 and is fixed to the piston 38 which is movably disposed in an open end cylinder 40 also defined by the housing. The open end of cylinder 40 is closed by a detachable cap 42. As shown in Figs. 5 and 6, when the piston 38 is in its furthermost right hand position abutting the cap 42, the butterfly valve 10 is closed to prevent the passage of air from the pressured supply source through the assembly. A coil spring 44 abuts the piston 38 within the cylinder 40 to urge the piston toward the aforedescribed "closed" position.

To open the butterfly valve 10, the piston 38 must be shifted away from the cap 42. Air pressure, from a source to be described hereinafter, is utilized to effect such movement, the air being admitted to the cylinder 40 from a port 46 formed in the cap and which is in communication with an air passageway 48 defined in the housing. A second air passageway 50 is defined in the housing to admit pressured air to the cylinder on the opposite side of the piston 38. It will be understood that the butterfly valve 10 can be opened to adjusted positions by achieving a pressure balance in the cylinder 40 on opposite sides of the piston 38 in adjusted positions of the piston. That is, the butterfly vane 20 will be held in any adjusted position when the difference between the pressure of the air in the "head" end of the cylinder 40 and the pressure of the air plus the force of the spring 44 bearing against the piston from the "rack" end of a cylinder provides sufficient torque to hold the butterfly vane in position against the forces of air flow in the line 12 and housing bore 30. As will be shown hereinafter, the butterfly vane will constantly fluctuate to effect pressure regulation except when in the fully open or fully closed positions.

The pilot valve 16 is utilized to control airflow through the passageways 48 and 50, and to thus control movements of the piston 38. The components of the pilot valve are disposed within a housing 52 which is secured as by screws 54, 54 to a pad 56 defined on the main housing 26. The said pilot valve housing has a central longitudinal bore which slidably receives an elongated cylindrical valve body or core 58 within a fixed sleeve or bushing 60. One end portion 62 of the housing 52 is enlarged to accommodate an air bellows 64 which is sealed in the enlarged open portion of the housing by a detachably secured cap 66. The inner end of the bellows 64 is closed by a plate 68. A coil spring 70 is located in the enlarged end portion of the pilot valve housing to abut the end plate 68 and thereby compress the bellows 64. The outer end of the valve core 58 also engages the end plate 68, being urged toward the bellows by a coil spring 72 which embraces the core with one end engaging a collar 74 thereon and the other end engaging the sleeve or bushing 60. It will be seen that the bellows 64 is utilized to thrust the valve core 58 inwardly when the bellows pressure is sufficient to overcome the forces exerted by the springs 70 and 72. It will also be seen that spring 72 forces the core 58 outwardly when the bellows pressure is reduced.

As shown in Fig. 6, the bushing 60 is provided with three radially directed ports 76, 77 and 79 which communicate, respectively, with air passageways 78, 80 and 82 in the housing 52 extending to the pad 56. A pair of spaced apart annular enlargements or rings 84, 84 on the core 58 are arranged to selectively open ports 76 and 79 to either the intermediate port 77 or to the open ends of the sleeve 60 by longitudinal movement of the core. More specifically, when the core is thrust inwardly or toward the right by the bellows, the rings 84, 84 will be disposed to connect port 77 with port 79 and port 76 with the open left end of sleeve 60 which is vented to atmosphere at the aperture 83. When bellows pressure is reduced and the core shifts outwardly or toward the left, the rings 84, 84 will be disposed to connect ports 77 and 76 and to connect port 79 with the open right end of sleeve 60 which is vented to atmosphere at the aperture 85. Accordingly, when the core is at the right, the air passageways 80 and 82 communicate and passageway 78 is vented to atmosphere. When the core is at the left, air passageways 80 and 78 communicate and passageway 82 is vented to atmosphere.

For an understanding of how the passageways 78, 80 and 82 in the pilot valve housing communicate with passageways in the main housing 26, attention is directed to Fig. 7 which shows a front elevational view of the pad 56 to which the pilot housing is secured.

Passageway 78 communicates with a channel 86 formed in the face of the pad 56 to extend downwardly and across the said face where the channel communicates with a passageway 88 defined in the main housing 26. As shown in Fig. 6, the passageway 88 communicates with passageway 48 extending to the "head" end of cylinder 40. Accordingly, when the pilot valve core is thrust outwardly, as when the bellows collapses, air can pass from passageway 80 to the "head" end of the cylinder through passageway 78, channel 86 and passageways 88 and 48.

Passageway 82 communicates, at the pad 56, with a passageway 90 formed in the main housing to communicate with passageway 50 extending to the "rack" end of the cylinder 40. Accordingly, when the pilot valve core is thrust inwardly by the bellows, air can pass from passageway 80 to the "rack" end of the cylinder through passageways 82, 90 and 50.

Passageway 80 in the pilot valve housing communicates, at the pad 56, with a passageway 92 defined in the main housing 26. The said passageway 92 extends into a vertical cylindrical bore 94 formed in the main housing above the butterfly shaft as shown in Figs. 5 and 6. An additional passageway 96 formed in the main housing to communicate with the bore 30 on the inlet side of the butterfly valve also communicates with the vertical bore 94. Accordingly, the passageway 80 is always suplied with air at compressor or source pressure through passageway 96, bore 94 and passageway 92.

Therefore, air at compressor pressure is directed by the pilot valve toward either the "head" end or "rack" end of the butterfly actuating cylinder 40, the other end being exposed to atmospheric pressure, depending upon the position of the pilot valve core as determined by the bellows.

The compressed air is filtered before entering the pilot valve in a filter unit 100 disposed in the vertical bore 94 of the main housing 26. The unit 100 includes a cage 102 supported on a split ring 104 engaged within an annular groove formed in wall of the bore 94. A filter pad or screen 106 rests on the bottom of the cage and is biased downwardly by a coil spring 108 which abuts against a cap 110 detachably secured to the top of the main housing so as to close the bore 94. The spring 108 is relatively light so that in the event the filter pad or screen 106 becomes clogged, the force of the compressed air will elevate the screen and find entry into the passage 92.

From the foregoing description, it will be ascertained that the pilot valve is bellows actuated to control the passage of air, at source or compressor pressure, to either the head or rack end of the butterfly actuating cylinder, thus controlling the position of the butterfly type throttle valve to regulate the pressure on the downstream or outlet side of the butterfly valve. To effect automatic pressure regulation, it is necessary to correlate bellows movements to downstream pressure fluctuations.

In the exemplary valve assembly shown, such correlation is achieved by providing an air passageway 112 in the main housing which extends from the downstream end of the bore 30 to the face of the pad 56 where it interconnects with a passageway 114 in the pilot valve housing. The passageway 114 (Figs. 5 and 6) extends toward the bellows end of the pilot valve where it communicates with a port 116 defined in the bellows cap 66 to extend to the interior of the bellows.

Therefore, the bellows is supplied with air at downstream pressure to actuate the pilot valve according to the requirements for regulation of downstream pressure. A selected downstream pressure can be substantially maintained by selection of the bellows spring 70 and pilot core spring 72. For example, if it is desired to maintain a downstream pressure of 30 lbs. per square inch, the springs 70 and 72 should be selected to bear a combined force on the bellows which will balance the internal pressure of 30 lbs. per square inch. If bellows or downstream pressure exceeds 30 lbs., the bellows will expand and force the pilot valve core inwardly to direct compressor air into the "rack" end of the cylinder to effect closing movement of the butterfly valve as described. The butterfly vane will close until downstream or bellows pressure falls below 30 lbs., whereupon the bellows will collapse and the pilot valve core will shift outwardly to direct compressor air to the "head" of the cylinder and thereby effect opening of the butterfly valve. The butterfly will continue to fluctuate between open and closed positions to effect pressure regulations of the downstream air at a substantially constant 30 lbs. per square inch level.

In further accord with the invention, and as previously mentioned, remotely controlled operating means are incorporated to permit pressure regulating operation of the pilot valve as described or selectively to shift the pilot valve to thereby effect complete closing of the butterfly valve.

Said operating means comprises solenoid 18 which includes a coil 120 held between a bracket 122 and plate 124. Elongated screws 126, 126 pass through the said plate and bracket and are threaded into a flange 128 on the pilot valve housing so that the coil 120 will be axially aligned with the pilot valve core 58 on the opposite end from the bellows.

An electrical coupling member 130 is mounted on top of the bracket 122 to receive lead-in wires for connection to coil terminals 132, 132. It will be understood that the coil circuit can be selectively opened and closed by a remotely positioned operator, such as a pilot or flight engineer in the exemplary aircraft installation, to energize and de-energize the coil.

When the coil 120 is energized, a solenoid plunger 134 is thrust toward the pilot valve core to engage a plug 136 secured in the end of a sleeve 138 which embraces the inner end of the said core in spaced relation. The sleeve 138 is slidably received within the inner end of sleeve 60 as shown in Fig. 6. The sleeve 138 has a radially extending flange 140 which provides a seat for one end of a coil spring 142, the other end of which abuts the flange 128 on the pilot valve housing. It will be seen in Fig. 6 that the spring 142 urges the sleeve 138 and plug 136 to the right or toward the solenoid. It will also be seen that when the solenoid is de-energized, such movement of the sleeve and plug is limited only by engagement of the plug with the end of the coil 120.

An internal shoulder 144 on the sleeve 138 is arranged to engage a collar 146 fixed to the inner end of the pilot valve core 58 and to thrust the core towards the right and thereby effect closing of the butterfly valve. It will be understood that the spring 142 selected should be considerably heavier than the core spring 72 to effect "closing" movement of the pilot valve against the force of spring 72 and against anticipated frictional forces tending to cause the pilot valve to remain in "open" position.

Of course, when the solenoid is energized, the plunger 134 forces the sleeve 138 toward the left to free the pilot valve core 58 for pressure regulating movements to the right and left as described. In Fig. 6, the components of the pilot valve are shown in the positions assumed immediately after the solenoid has been energized and before the bellows has assumed control thereof. In this position of the pilot valve, the butterfly valve is closed, but will immediately start to open when the core shifts toward the collapsed bellows.

The over all operation of the valve assembly should be fully understood from the foregoing description and, therefore, only a brief summary of operation follows.

Assume, for example, that the assembly is applied to an aircraft engine pneumatic starter and that the butterfly throttle valve is closed. To effect starter operation, the pilot or flight engineer closes a switch in the solenoid circuit to energize the solenoid. The solenoid plunger 134 then shifts the sleeve 138 toward the left thereby permitting axial movements of the pilot valve core 58 as controlled by the bellows 64.

Since there is no substantial downstream pressure, the bellows will be collapsed thereby permitting the pilot valve core to shift toward the left. When the core shifts to the left, air under compressor pressure is admitted to the "head" end of cylinder 40 and the rack end is exposed to atmospheric pressure thus forcing the piston 38 and rack 34 toward the left to effect opening movement of the butterfly vane 20. Pressure on the downstream side of the butterfly valve will then build up, probably exceeding the selected limit. When downstream pressure exceeds the said limit, the bellows will expand to shift the pilot valve core toward the right, thereby directing pressured air into the "rack" end of the cylinder at the same time opening the passageway to the "head" end to atmospheric pressure. The piston and rack will be moved toward the right to effect closing movement of the butterfly valve. The butterfly vane will fluctuate between opening and closing movements to maintain pressure to the pneumatic starter substantially constant at a preselected level.

When the aircraft engine has started, the pilot or flight engineer then opens the switch in the solenoid circuit to de-energize the same. When de-energized, the solenoid plunger can be forced to the right by sleeve 138 and plug 136 biased by spring 142. The said sleeve will engage and shift the pilot valve core to the right to thereby effect complete closing of the butterfly valve. The butterfly vane will remain closed until starter operation is again instituted by energizing the solenoid.

Although not a part of the present invention, it is contemplated that means for automatically de-energizing the solenoid will be incorporated in the system. Such means may include a holding circuit to retain a starter switch or button in closed position energizing the solenoid. A centrifugally responsive switch operated by the aircraft engine can be utilized to open the holding circuit after the engine has started operation thereby automatically de-energizing the solenoid.

It will be understood that many modifications of the valve assembly can be accomplished without departing from the invention and, therefore, the scope of the invention should not be limited to the embodiment shown and described otherwise than indicated by the claims which follow.

I claim:

1. In a fluid conduit pressure regulating and shut-off valve assembly of the type having a throttle movable between open and closed positions in the conduit and fluid pressure responsive actuating means operatively connected to the throttle, the combination comprising a pilot valve housing having an inlet for fluid under pressure and two outlets connected to said actuating means, a valve member disposed in said pilot valve housing for movement between one position wherein fluid flows through only one of said outlets to said actuating means whereby said actuating means closes said throttle and another position wherein fluid flows through only the other of said outlets to said actuating means whereby said actuating means opens said throttle, means responsive to conduit pressure downstream of said throttle engageable with said valve member to urge the same towards said one position, a spring disposed in said pilot valve housing and engaging said valve member to urge the same towards said other position, spring biased means adapted to engage said valve member to resiliently hold the same in said one position, and solenoid operated means engageable with said spring biased means to disengage the same from said valve member.

2. In a fluid conduit pressure regulating and shut-off valve assembly of the type having a throttle movable between open and closed positions in the conduit and fluid pressure responsive actuating means operatively connected to the throttle, the combination comprising a pilot valve housing having an inlet for fluid under pressure and two outlets connected to said actuating means, an axially movable core disposed in said pilot valve housing for movement between one position wherein fluid flows through only one of said outlets to said actuating means whereby said actuating means closes said throttle and another position wherein fluid flows through only the other of said outlets to said actuating means whereby said actuating means opens said throttle, means responsive to conduit pressure downstream of said throttle engageable with one end of said core to urge the same towards said one position, a spring disposed in said pilot valve housing and engaging said core to urge the same towards said other position, spring biased means adapted to engage the other end of said core to resiliently hold the same in said one position, and solenoid operated means engageable with said spring biased means to disengage the same from said core.

3. In a fluid conduit pressure regulating and shut-off valve assembly of the type having a throttle movable between open and closed positions in the conduit and a hydraulic piston operatively connected to the throttle for controlling the position thereof, the combination comprising a pilot valve housing having an inlet for fluid under pressure and two outlets arranged to admit fluid to opposite sides of the piston, an axially movable core disposed in said pilot valve housing for movement between one position wherein fluid flows through only one of said outlets to said piston to close said throttle and another position wherein fluid flows through only the other of said outlets to said piston to open said throttle, a bellows engageable with one end of said core to urge the same towards said one position, means defining a fluid passageway from the conduit on the downstream side of said throttle to the interior of said bellows, a spring disposed in said pilot valve housing and engaging said core to urge the same towards said other position, spring biased means adapted to engage the other end of said core to resiliently hold the same in said one position, and solenoid operated means engageable with said spring biased means to disengage the same from said core.

4. In a fluid conduit pressure regulating and shut-off valve assembly of the type having a throttle movable between open and closed positions in the conduit and a hydraulic piston operatively connected to the throttle for controlling the position thereof, the combination comprising a pilot valve housing having an inlet for fluid under pressure and two outlets arranged to admit fluid to the opposite sides of said piston, an axially movable core disposed in said pilot valve housing for movement between one position wherein fluid flows through only one of said outlets to said piston to close said throttle and another position wherein fluid flows through only the other of said outlets to said piston to open said throttle, means responsive to conduit pressure downstream of said throttle engageable with one end of said core to urge the same towards said one position, a spring disposed in said pilot valve housing and engaging said core to urge the same towards said other position, a collar fixed to said core adjacent the other end thereof, a sleeve slidably embracing said core and engageable with said collar, a spring biasing said sleeve into engagement with said collar to resiliently hold said core in said one position, and solenoid operated means engageable with said sleeve to disengage the same from said collar.

5. In a fluid conduit pressure regulating and shut-off valve assembly of the type having a throttle movable between open and closed positions in the conduit and a hydraulic piston operatively connected to the throttle to open and close the same, the combination comprising a pilot valve housing having an inlet for fluid under pressure and two outlets arranged to admit fluid on the opposite sides of said piston, means defining a passageway between the conduit on the upstream side of said throttle and the inlet of said pilot valve housing, an axially movable core disposed in said pilot valve housing for movement between one position wherein fluid flows through only one of said outlets to said piston to close said throttle and another position wherein fluid flows through only the other of said outlets to said piston to open said throttle, a bellows engageable with one end of said core to shift the same towards said one position, means defining a fluid passageway from the conduit on the downstream side of said throttle to the interior of said bellows, a spring disposed in said pilot valve housing and engaging said core to urge the same towards said other position, a collar fixed to said core adjacent the other end thereof, a sleeve slidably embracing the core and engageable with said collar, a spring biasing said sleeve into engagement with said collar to resiliently hold the core in said one position, said sleeve having an enlarged portion surrounding the collar and extending beyond said other end of the core, and solenoid operated means engageable with said extending portion of the sleeve to disengage said sleeve and said collar.

References Cited in the file of this patent

UNITED STATES PATENTS

| | | |
|---|---|---|
| 737,681 | Waring | Sept. 1, 1903 |
| 1,201,426 | Anderson | Oct. 17, 1916 |
| 1,756,824 | Hasemann | Apr. 29, 1930 |
| 2,050,430 | Erickson | Aug. 11, 1936 |
| 2,219,359 | Goit et al. | Oct. 29, 1940 |
| 2,291,101 | Papulski | July 28, 1942 |
| 2,412,490 | Biggle | Dec. 10, 1946 |

FOREIGN PATENTS

| | | |
|---|---|---|
| 491,372 | France | Jan. 31, 1919 |